Feb. 17, 1942.  E. H. PIRON  2,273,620
METHOD OF MAKING WHEEL PLATES
Filed March 9, 1939
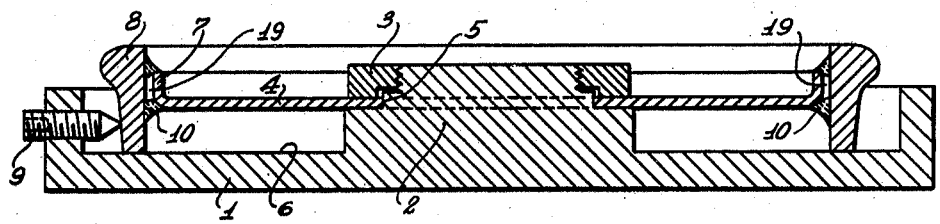
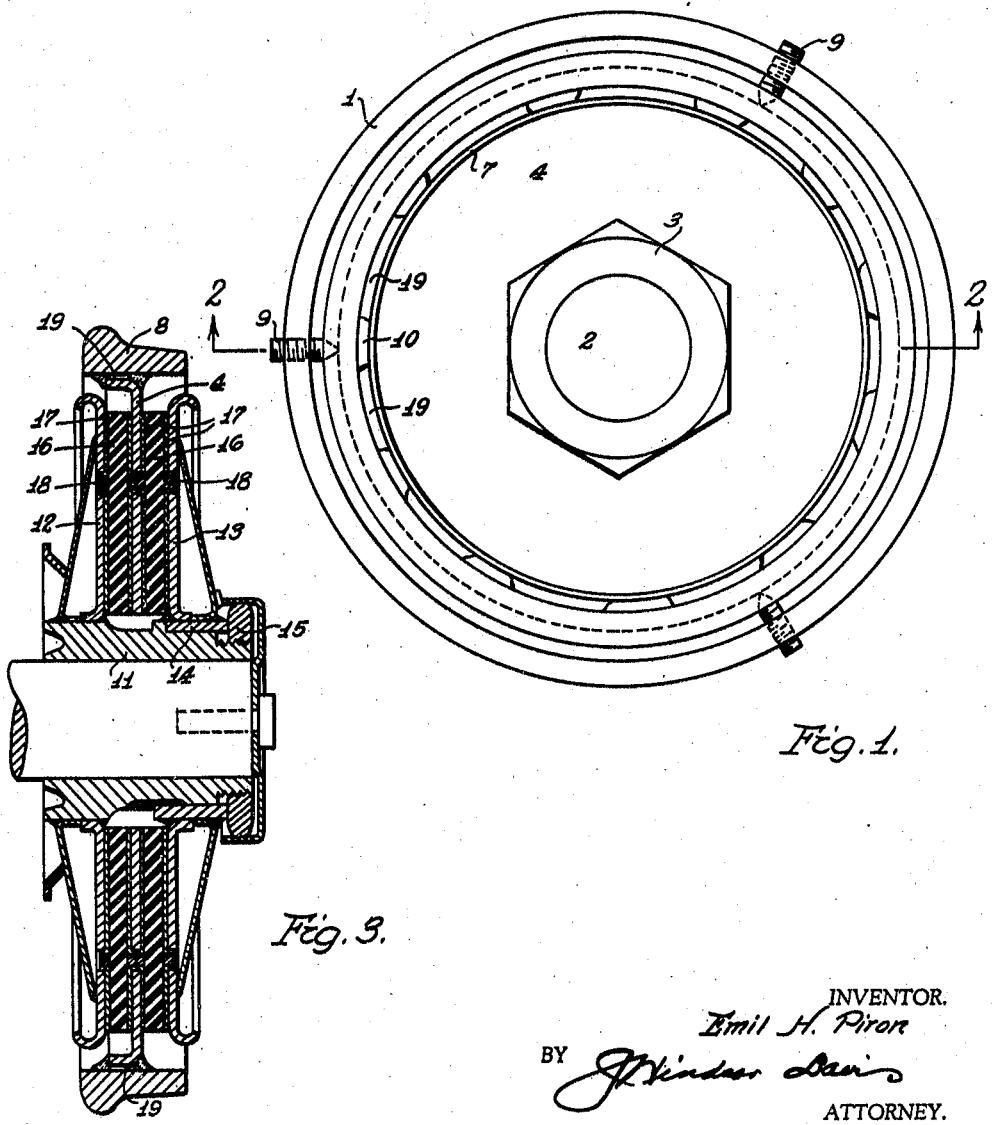
INVENTOR.
Emil H. Piron
BY
ATTORNEY.

Patented Feb. 17, 1942

2,273,620

UNITED STATES PATENT OFFICE 2,273,620

METHOD OF MAKING WHEEL PLATES

Emil H. Piron, New York, N. Y., assignor to Transit Research Corporation, a corporation of New York Application March 9, 1939, Serial No. 260,812

1 Claim. (Cl. 29—168)

This invention relates to rail wheels and the method of making same and has for its object to provide a tire and tire carrying plate for a resilient wheel of improved construction which can be made at a substantial saving in cost.

In resilient wheels of the type wherein a tire carrying plate supports its wheel hub through resilient elements acting in shear it is desirable to employ a tire having long lasting qualities whereas the plate radiating inwardly thereof may and preferably is of heavy sheet metal construction which need have no particular friction resisting qualities. An object of this invention is to provide a tire and tire carrying plate of separately chosen materials and separately fabricated of such construction that they may be joined together without the necessity of a machining operation on either thereof.

More particularly it is an object to provide a tire and tire carrying plate designed for concentric fitting to an accuracy such as may be expected in a tire made by rolling and to secure the parts together, preferably by welding.

Other objects and advantages will become more fully apparent as reference is had to the accompanying drawing wherein my invention is illustrated, and in which:

Fig. 1 is a plan of the tire and plate indexing means with a tire and plate assembled therein, Fig. 2 is a section taken on the line 2—2 of Fig. 1, and Fig. 3 is a vertical section of a wheel.

Referring to Figs. 1 and 2, I designates a fixture having a central support 2 with means 3 for clamping a plate 4 thereon with its central opening 5 accurately located with respect to the center of the fixture, and with the main portions of the plate located in a plane exactly parallel to the bottom surface of the fixture. The plate 4 is provided with a peripheral flange 7 and is, therefore, cup-shaped.

A tire 8, provided with an exactly circular exterior, is placed in the fixture and rests upon the surface 6. The surface 6 supports the tire in a plane exactly parallel to the plane of the main portion of the plate 4, and adjustable elements 9 engage and hold the tire with its exterior surface exactly concentric with the opening 5 in the plate 4. The plate and the tire are then welded together as indicated at 10, while they are maintained in the above described relationship.

As may be seen in Fig. 2 the inner diameter of the tire 8 and the outer diameter of the plate 4 are correlated to provide a substantial space between the tire and the plate, so that the inner surface of the tire and the outer surface of the plate have no part in the function of centralizing the tire with respect to the plate. Said surfaces may be of uncertain dimensions and irregular form and, therefore, require no machining or finishing operations.

After assembly of the tire and plate as above described the two elements are assembled in a wheel structure such as shown in Fig. 3, and which comprises a hub 11 having spaced plates 12 and 13 radiating outwardly therefrom. The plate 12 is fixed with respect to the hub 11 and the plate 13 is fixed with respect to a sleeve 14 which is secured on the hub by a nut 15. The tire supporting plate 4 radiates inwardly between the two plates 12 and 13, and is supported from the plates 12 and 31 by means of rubber 16 in shear. The masses 16 of rubber have discs 17 surface bonded thereto and retained with respect to the plates 4, 12 and 13 by dowels 18.

With the wheel in use, radial loading is transmitted from the tire 8 to the plate 4 through the welds 10, and from the plate 4 it is transmitted through the elastic masses 16 to the plates 12 and 13 and the hub 11. The welds 10 may be spaced apart as shown in Fig. 1 to provide air gaps 19 between the tire 8 and the plate 4. The transfer of heat, generated by brake shoes contacting the tire, from the tire to the plate is thus reduced, with the result that the elastic masses are less likely to be damaged by such heat.

Although a specific embodiment of the invention is illustrated and described, it will be understood that various changes may be made within the scope of the appended claim without departing from the spirit of the invention, and such changes are contemplated.

What is claimed is:

The method of making a tire and tire carrying plate for a resilient wheel which consists in forming a metallic tire, in placing in said tire a flat round metallic plate having an annular rim portion of sufficiently less diameter than the inside diameter of said tire to provide a substantial gap therebetween, and in welding said plate at opposite sides said rim portion to said tire, the welds being spaced both laterally and circumferentially whereby substantial portions of said gap are unobstructed and facilitate circulation of air both laterally between circumferentially spaced welds and circumferentially between the laterally spaced welds said plate having a central opening therethrough concentric with said tire irrespective of whether the outside periphery is concentric with said tire thereby causing possible variations in the sizes of said welds.

EMIL H. PIRON.